United States Patent [19]

Lee et al.

[11] Patent Number: 5,591,394

[45] Date of Patent: Jan. 7, 1997

[54] ZIRCONIUM-BASED HYDROGEN STORAGE ALLOY USEABLE FOR NEGATIVE ELECTRODES FOR SECONDARY BATTERY

[76] Inventors: Jai Y. Lee, Hanbit Apt. 107-902, Ayeun-dong, Yuseong-ku, Taejeon; Soo R. Kim, 363-1, Hongeun 3-dong, Seodaimun-ku, Seoul, both of Rep. of Korea

[21] Appl. No.: 263,745

[22] Filed: Jun. 22, 1994

[30] Foreign Application Priority Data

Sep. 13, 1993 [KR] Rep. of Korea ............... 93-18336

[51] Int. Cl.$^6$ .................... C22C 16/00; C22C 30/00
[52] U.S. Cl. ............. 420/422; 420/584.1; 420/588; 420/900
[58] Field of Search .................... 420/422, 584, 420/586, 588, 900

[56] References Cited

U.S. PATENT DOCUMENTS

| | | | |
|---|---|---|---|
| 3,874,928 | 4/1975 | Will | 429/59 |
| 4,004,943 | 1/1977 | Boter | 429/59 |
| 4,214,043 | 7/1980 | van Deutekom | 429/27 |
| 4,487,817 | 12/1984 | Willems et al. | 429/27 |
| 4,551,400 | 11/1985 | Sapru et al. | 420/900 |
| 4,717,629 | 1/1988 | Ishikawa et al. | 428/566 |
| 4,849,205 | 7/1989 | Hong | 420/588 |
| 4,946,646 | 8/1990 | Gamo et al. | 420/588 |
| 5,278,001 | 1/1994 | Ono et al. | 420/900 |
| 5,384,209 | 1/1995 | Bouet et al. | 420/588 |
| 5,407,761 | 4/1995 | Ovshinsky et al. | 420/584.1 |

FOREIGN PATENT DOCUMENTS

| | | |
|---|---|---|
| 61-132501 | 6/1986 | Japan . |
| 61-214361 | 9/1986 | Japan . |
| 62-296365 | 3/1987 | Japan . |

OTHER PUBLICATIONS

M. H. J. van Rijswick, "Metal Hydride Electrodes for Electrochemical Energy Storage", P. R. Laboratories, pp. 261–271 (1977).

S. Wakao et al, "Effects of Partial Substitution and Anodic Oxidation Treatment of Zr–V–Ni Alloys on Electrochemical Properties", Journal Less–Common Metals, vol. 172–174, pp. 1219–1226 (1991).

Y. Moriwaki et al, "Electrode Characteristics of C15–type Laves Phase Alloys", Journal Less–Common Metals, vol. 172–174, pp. 1211–1218 (1991).

A. H. Boonstra et al, "Degradation Processes in a LaNi$_5$ Electrode", Journal Less–Common Metals, vol. 155, pp. 119–131 (1989).

H. Ishikawa et al, "Preparation and Properties of Hydrogen Storage Alloy–Copper Microcapsules", Journal Less–Common Metals, vol. 107, pp. 105–110 (1985).

T. Sakai et al, "Rare–Earth–Based Alloy Electrodes for a Nickel–Metal Hydride Battery", Journal Less–Common Metals, vol. 172–174, pp. 1175–1184 (1991).

T. Sakai et al, "Rechargeable Hydrogen Batteries Using Rare–Earth–Based Hydrogen Storage Alloys", Journal of Alloys and Compounds, vol. 180, pp. 37–54 (1992).

S. Venkatesan et al, "Characterization of Metal Hydride Alloys for Battery Applications", Int. Symp. on Metal–Hydrogen Systems, Uppsala, Sweden, Jun. 11, 1992.

*Primary Examiner*—George Wyszomierski
*Attorney, Agent, or Firm*—Burns, Doane, Swecker & Mathis, LLP

[57] ABSTRACT

A zirconium-based hydrogen storage alloys having the composition formula:

$$Zr_{1-x}Q_xCr_{1-Y-Z-A-B}Mn_YFe_ZCo_AV_BNi \qquad (I)$$

wherein Q is Ti or Hf; $0<x\leq0.3$; and $0<Y+Z+A+B<1$, are disclosed. The Zr-based hydrogen storage alloy has a C-14 hexagonal structure and is mainly composed of single phase. The alloy is useable for a negative electrode material for secondary batteries. The Zr-based hydrogen storage alloy also has also a discharge capacity of 300~377 mAg/g and low reduction of discharge capacity at a low temperature and discharge rate.

5 Claims, 7 Drawing Sheets

$ZrCr_{0.8}Mn_{0.2}Ni$ $ZrCr_{0.8}Fe_{0.2}Ni$

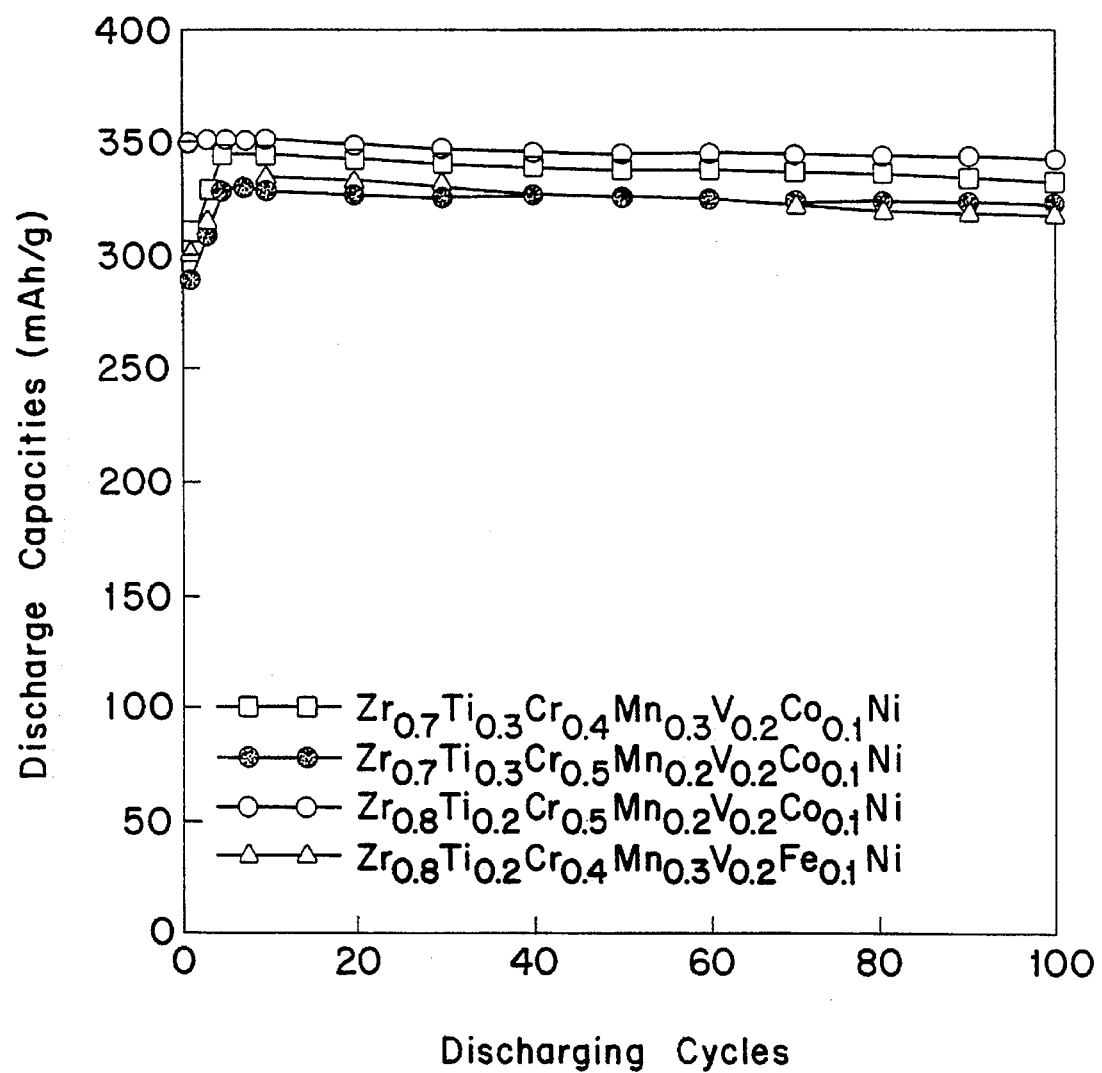

ZIRCONIUM-BASED HYDROGEN STORAGE ALLOY USEABLE FOR NEGATIVE ELECTRODES FOR SECONDARY BATTERY

BACKGROUND OF THE INVENTION

1. Field of the Invention

The present invention relates to a novel zirconium-based hydrogen storage alloy useable for negative electrodes for secondary batteries. More particularly, the present invention relates to a single-phase, Zr-based alloy which has a C-14 hexagonal structure and improved temperature and current density dependencies of discharge capacities, and of which alloying elements and composition are specifically modified so as to be suitable for practical nickel-metal hydride (Ni—MH) secondary batteries.

2. Description of the Prior Art

U.S. patent application Ser. No. 08/012,408, filed Feb. 2, 1993 describes two groups of zirconium-based hydrogen storage alloys which are useful as negative electrodes for rechargeable batteries. The first group is represented by the formula:.

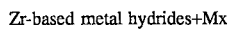

Zr-based metal hydrides+Mx wherein M is a light rare earth metal selected from the group consisting of La, Nd, and Mm; $0<x<0.1$; and the Zr-based metal hydrides means that the metal hydrides are mainly in a Zr-based Laves phase such as ZrCrNi and $Zr(V_{0.33}Ni_{0.67})_{2.4}$. The second group is represented by the formula:

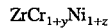

$ZrCr_{1+y}Ni_{1+z}$ wherein $0 \leq y < 0.2$, and $0 \leq z \leq 0.2$, provided that y and z cannot be zero concurrently.

In the last few years, popularization of various cordless appliances such as video cameras, laptop computers and cellular telephones has increased the production of sealed nickel/cadmium (Ni—Cd) batteries. This has caused a shortage in cadmium supply and a rapid increase in the price of cadmium to more than four times its former cost. In addition, failure to recover spent Ni—Cd batteries is causing serious environmental problems since cadmium, a toxic heavy metal, is a source of pollution.

Since the mid-1980s, much research has been conducted on the replacement of cadmium with other elements. Nickel-metal hydride [Ni—MH] batteries using a hydrogen storage alloy in place of cadmium have been developed. See, U.S. Pat. Nos. 3,874,928 to will; 4,004,943 to Boter; and 4,214,043 to Deutekom; and Japanese Patent Publication No. 62-296,365 Al. Since 1991, such Ni—MH secondary batteries have been commercialized.

In the Ni—MH batteries, the electrode reactions occur as follows. During discharging, hydrogen atoms released from the hydrogen storage alloy combine with hydroxide ions (OH⁻) in an electrolyte solution to form water, with a concurrent flow of electrons through an external circuit to a positive electrode. During charging, water in the electrolyte solution is decomposed into a hydrogen ($H^+$) and a hydroxide ion (OH⁻). The hydrogen ion ($H^+$) accepts an electron to form atomic hydrogen which in turn combines with and is stored by the hydrogen storage alloy in its atomic state. The hydroxide ion (OH⁻) remains in the electrolyte solution. These Ni—MH batteries have been made by taking advantage of the reversibility of hydrogen storage alloys that rapidly and stably absorb and release a large amount of hydrogen in an alkaline solution. It has been found that such Ni—MH batteries have a 1.5–2 times larger cell capacity and a 2 times or faster charge rate than conventional nickel/cadmium batteries, with almost comparable cell characteristics, such as voltage, rate capability, overcharge protection, and charge retention.

Hydrogen storage alloys may have very different properties depending on their types. Only hydrogen storage alloys having a plateau pressure of about 1 to 0.01 atm at about 0° to 40° C. can be used as negative electrodes for secondary batteries. See, Proc. Int. Sym. Hydrides for Energy Storage, Geilo, Norway, pp. 261 (1977). Representative examples of hydrogen storage alloys which can be used in secondary batteries, include La—Ni based alloys [See, U.S. Pat. No. 4,487,817 to Willens et al.]; Mm(misch metal)—Mn—Ni—Co—Al based alloys [See, Japanese Patent Publication Nos. 61-132,501 Al and 61-214,360 Al]; Ti—V—Ni—Cr based alloys [See, U.S. Pat. No. 4,551,400 to Sapru et al.]; Zr—V—Ni based alloys [See, Y. Moriwaki at al., J. Less-Common Metals, Vol. 172–174, pp. 1219–1226 (1991)]; and Zr—Cr—Mn—Ni based alloys [See, Y. Moriwaki et al., J. Less-Common Metals, Vol. 172–174, pp. 1211–1218 (1991)].

Among the above alloys, however, the La—Ni based alloys suffer from the disadvantage that they have a very sharply decreasing electrode capacity in alkaline electrolytes during charge/discharge cycles. See, A. H. Boonstra, et al., J. Less-Common Metals, Vol. 161, pp. 193 (1989), and idem, Vol. 155, pp. 119–131 (1989). This drawback, so-called "degradation," can be reduced somewhat by electroless plating with copper of the surface of the alloys in order to extend the lifetime of the La—Ni based alloy electrodes. See, H. Ishikawa et al., J. Less-Common Metals, Vol. 107, pp. 105–110 (1985). This electroless plating contributes somewhat to the extension of the lifetime of electrodes, but can create another source of environmental pollution because the processes involve the use of an aqueous solution which produces chlorine gas.

Another approach to overcoming the disadvantage involves the recent development of Zr-based hydrogen storage alloys. These have a larger hydrogen absorbing capacity and a longer cycle life than conventional hydrogen storage alloys. Examples of such Zr-based hydrogen storage alloys include Zr—V—Ni based alloys and Zr—Cr—Mn—Ni based alloys, which have a C-15 cubic structure (f.c.c.: body centered crystal). See, To Sakai et al., J. Less-Common Metals, Vol. 172–174, pp. 1175–1184 (1991), and idem, Vol. 180, pp. 37 (1992).

In general, hydrogen storage alloys to be used as electrode materials for secondary batteries should have excellent electro-chemical properties such as discharge capacity, lifetime, low temperature discharge rate, charge/discharge rate capability, and self-discharge rate. Also, hydrogen storage alloys to be used as electrode materials for secondary batteries are required to have the hydriding properties of appropriate plateau pressure, large hydrogen absorbing capability, fast hydriding rate, and long cyclic life. It has been found that Zr-based hydrogen storage alloys almost satisfy the requirements for electrode materials for secondary batteries mentioned above, but have quite low equilibrium hydrogen pressures and inclined plateau pressures. Therefore, those alloys have been found deficient as electrode materials for secondary batteries.

Consequently, it has been desired to provide a Zr-based hydrogen storage alloy having improved performances in terms of temperature and reaction rate dependencies of discharge capacity with a increased discharge capacity and cycle behaviors such as cycle life.

We have found that a single phase, Zr-based hydrogen storage alloy having specific alloying elements and composition, wherein Zr is partially replaced with Ti or Hf, and wherein Cr is partially replaced with one or more alloying elements selected from the group consisting of Mn, Fe, Co and V, has the C-14 hexagonal structure and exhibits improved, performance in terms of temperature and current density dependencies of discharge capacities, as compared with conventional Zr-based alloy materials, with improved discharge capacity and cycle behavior.

SUMMARY OF THE INVENTION

It is therefore an object of the present invention to provide a Zr-based hydrogen storage alloy having improved performance in terms of temperature and current density dependencies of discharge capacity, with increased discharge capacity and cycle behavior.

Further objects and advantages of the invention will become apparent through reading the remainder of the specification.

BRIEF DESCRIPTION OF THE DRAWINGS

FIG. 8 is a graph showing changes in discharge capacity of a Zr—Ti—Cr—Mn—V—Co—Ni alloy electrodes according to the invention, depending on the discharging cycles.

DETAILED DESCRIPTION OF THE INVENTION

Figure 1:
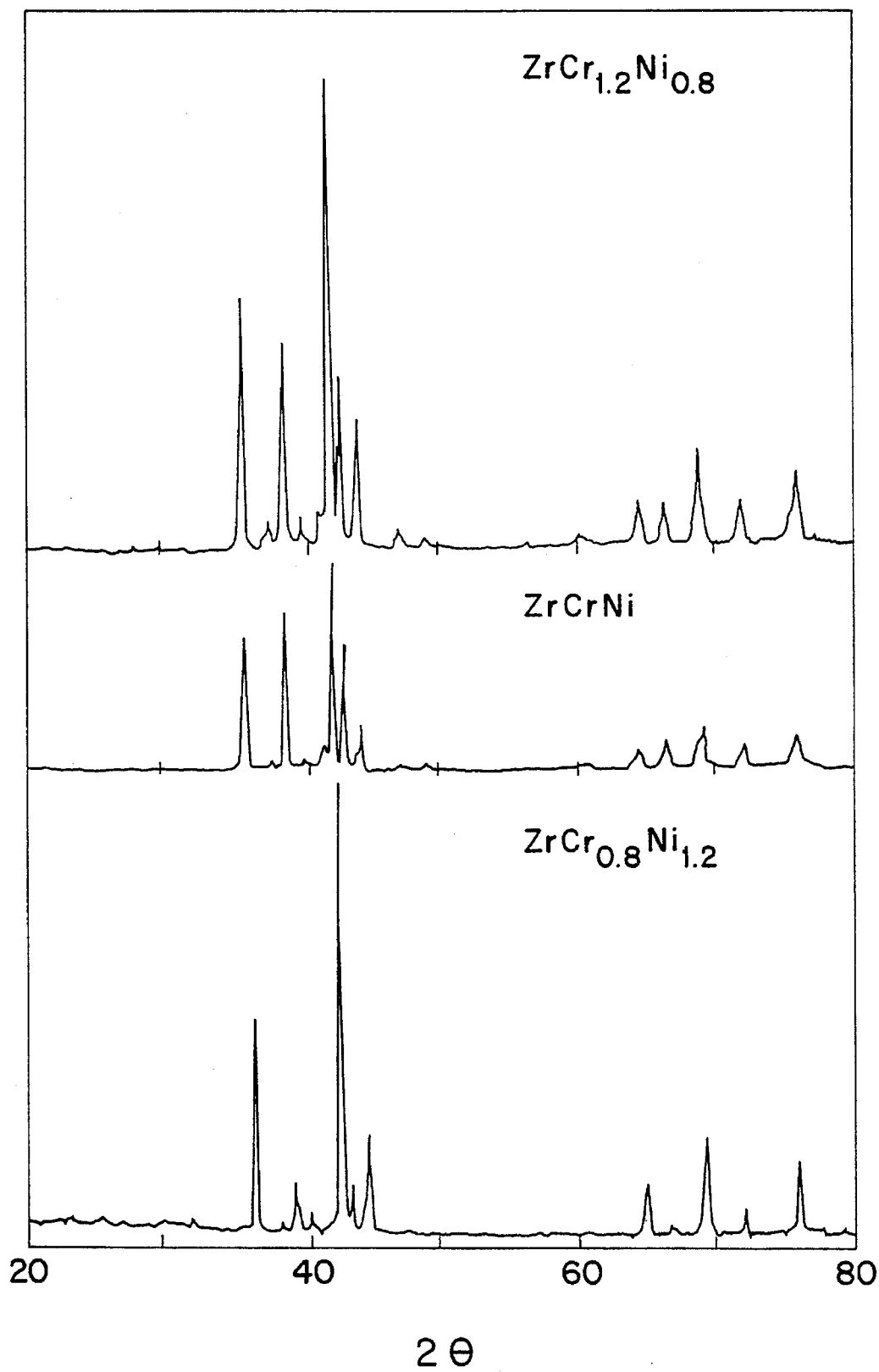
FIG. 1 shows X-ray diffraction patterns of a hydrogen storage alloy having the formula, $ZrCr_{1.2}Ni_{0.8}$, $ZrCrNi$, and $ZrCr_{0.8}Ni_{1.2}$, respectively.

According to the present invention, a single phase Zr-based hydrogen storage alloy is provided which can be represented by the formula:

$$Zr_{1-x}Q_xCr_{1-Y-Z-A-B}Mn_YFe_ZCo_AV_BNi \quad (I)$$

wherein Q is Ti or Hf; $0.1 < x \leq 0.3$; $0 < Y < 1$; $0 \leq Z$; $A < 1$; $0 < B < 1$; and $0 < Y+Z+A+B < 1$; provided that Z and A are not 0 at the same time.

The Zr-based hydrogen storage alloy according to the invention has a C-14 hexagonal structure and a discharge (hydrogen storage) capacity of 300–377 mAh/g, and exhibits a reduced decrease in discharge capacity at low temperatures and discharge rates. Thus, the alloy is useful as a negative electrode material for secondary batteries.

The invention will hereinafter be described in greater detail. Electrode specimens were prepared from a Zr-based hydrogen storage alloy of the invention, and then the electrochemical properties thereof were investigated as follows.

(1) Preparation of P-C-T Curves of Hydrogen Storage Alloys

Alloying elements were each weighed in an amount determined in accordance with their atomic ratios according to the composition of desired Zr-based hydrogen storage alloys. A total of about 5 g of such elements were arc melted. The melted elements were solidified. The resultant alloy specimens were turned over, and then re-melted. This procedure was repeated four to five times to enhance the uniformity of the resulting alloy. The alloy specimens thus obtained were crushed to particles having a particle size of 100–200 mesh. The crushed specimens having a 100–200 mesh particle size were placed into a reaction tube connected to a Sievert's type high pressure hydrogen apparatus. The specimens were subject to activation treatment by maintaining the inside of the reaction tube at about $10^{-2}$ torr for about 30 minutes and then by introducing hydrogen at about 20 atm without heat treatment. The hydrogen was completely absorbed within an hour. The inside of the reaction tube was maintained again under vacuum to release all hydrogen within the alloy specimens. This absorption-release procedure of hydrogen was repeated three to four times until the procedure was completed within a few minutes. After the activation treatment, the hydrogen input apparatus including the reaction tube was maintained at a constant temperature using an automatic temperature controller. Equilibrium hydrogen pressure curves according to the hydrogen composition upon absorption-release of hydrogen at given temperatures were obtained. From the curves, thermodynamic properties such as the amount of hydrogen to be absorbed, plateau pressure, and the like were obtained.

(2) Evaluation of characteristics of hydrogen storage alloys in alkaline electrolytes Alloying elements were each weighed as native metals in an amount sufficient to provide a desired composition of the alloy, and melted under an argon atmosphere to give Zr-based hydrogen storage alloy specimens. The alloys thus obtained were crushed mechanically and mixed with an appropriate amount of nickel or copper powder and a TEFLON® powder, and then subject to pressure molding to give negative electrodes. Half cells were constructed by immersing the electrodes thus prepared in a 30 wt % KOH electrolyte solution and using a platinum or nickel wire as a counter electrode. Hydrogen was introduced into the negative electrodes by applying a constant current between the two electrodes through an ammeter. Upon discharging, the flow of the current between the two electrodes was inverted. Voltages of the hydrogen storage alloys were measured using a saturated calomel electrode and a mercury oxide (Hg/HgO) electrode as reference electrodes, respectively. The discharge capacity was represented as ampere capacity per unit weight (mAh/g) during discharging at a constant current.

DESCRIPTION OF THE PREFERRED EMBODIMENTS

The present invention will be illustrated in greater detail by way of the following examples. The examples are presented for illustrative purposes only and should not be construed as limiting the invention, which is properly delineated in the claims.

EXAMPLE 1

This example is intended to investigate changes in the hydrogen storage and electrode characteristics of a ZrCrNi-based hydrogen storage alloy having the C-14 hexagonal structure, according to the replacement of alloying elements.

First, in order to determine the Ni content in a Zr-based alloy of the present invention, X-ray diffraction patterns of the Zr-based alloy having the formula $ZrCr_{1-j}Ni_{1+j}$ were observed with variations only in the contents of Cr and Ni without the replacement of alloying elements. The results are shown in FIG. 1. It can be seen from FIG. 1 that as the relative content of Ni to Cr increases, the resulting alloys show a tendency to have a C-15 cubic structure. Thus, in the Zr-based alloy according to the invention, the Ni content was determined under conditions that in the formula $ZrCr_{1-j}Ni_{1+j}$, $j>0.05$.

Figure 2:
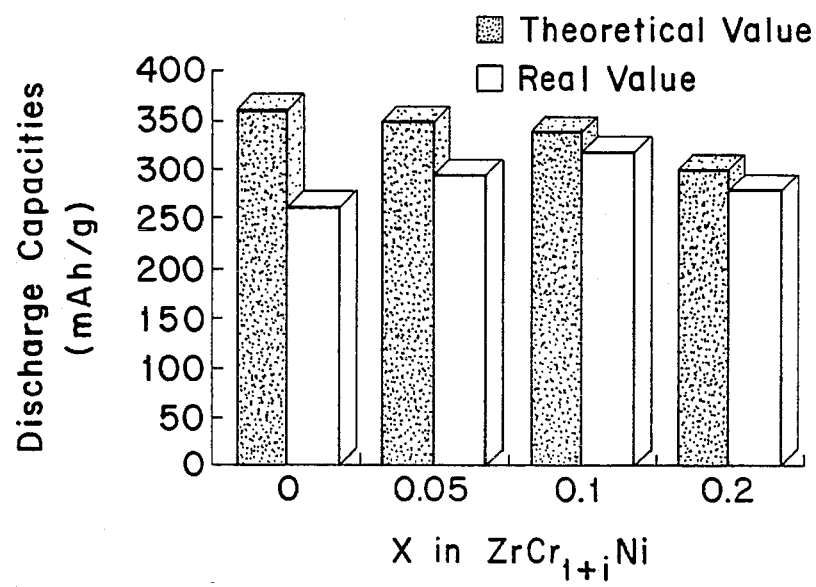
FIG. 2 is a graph showing the differences between theoretical discharge capacity and real discharge capacity of a Zr-based alloys having the formula, $ZrCr_{1+i}Ni$ wherein $i=0$, 0.05, 0.1, or 0.2.

In order to determine the content of Cr in the Zr-based alloys of the invention, the relation between theoretical discharge capacity and actual discharge capacity of a Zr-based alloy having the formula $ZrCr_{1+i}Ni$ was then plotted, as shown in FIG. 2. The theoretical discharge capacity is calculated from the amount of hydrogen absorbed by the $ZrCr_{1+i}Ni$ alloys, while the actual discharge capacity is measured after electrodes are constructed using the alloys. It can be seen from FIG. 2 that if i is below 0.1, the discharge efficiency which is defined as the ratio of the actual discharge capacity to the theoretical discharge capacity is low, while if i is above 0.1, the theoretical discharge capacity is lowered, and accordingly, the actual discharge capacity decreases again. Thus, the value i in the $ZrCr_{1+i}Ni$ alloy was determined to be $i \leq 0.1$ at which the discharge efficiency has the maximum value.

Figure 3:
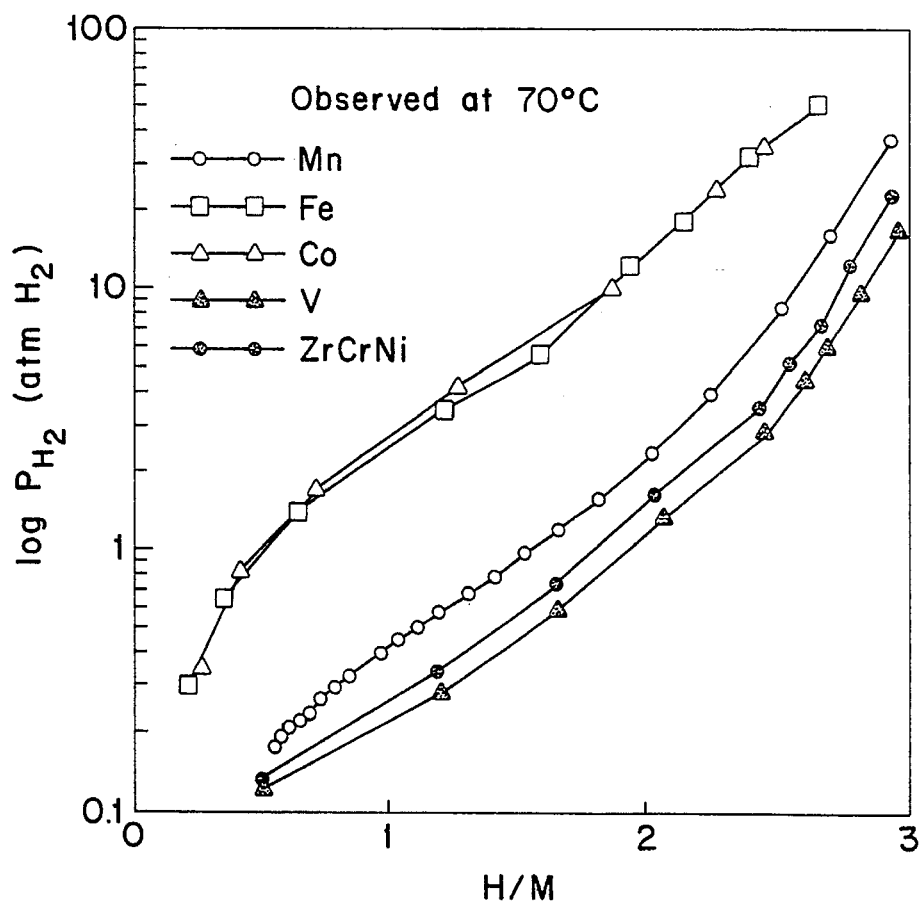
FIG. 3 shows P-C-T curves of a Zr-based alloy having the formula, $ZrCr_{0.8}R_{0.2}Ni$ wherein R is a Mn, Fe, Co, or V.

In order to obtain fundamental information concerning thermodynamic and electrochemical properties of the Zr-based hydrogen storage alloys according to the invention, Zr—Cr—Ni based alloys wherein Cr was replaced with a transition metal, i.e., having the formula $ZrCr_{0.8}R_{0.2}Ni$ wherein R is Mn, Fe, Co, or V were prepared, and then, P-C-T curves thereof were observed. The results are shown in FIG. 3. From FIG. 3, it can be seen that all alloys, except the alloy in which Cr was replaced partially with V, have the increased equilibrium hydrogen pressure, and in particular, the replacement of Cr with Co or Fe is more effective in controlling the equilibrium hydrogen pressure.

Figure 4A:
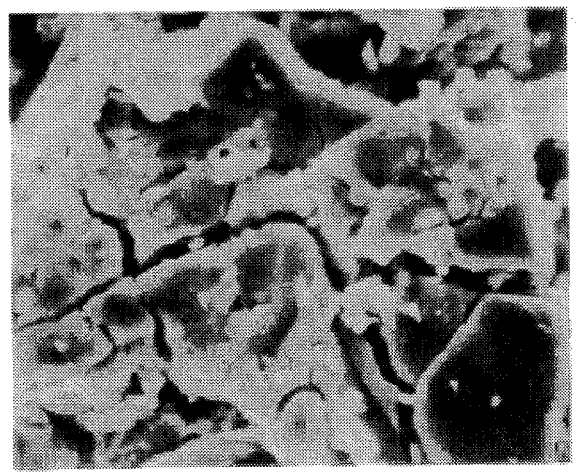
FIG. 4(A) is a surface microphotograph of $ZrCr_{0.8}Mn_{0.2}Ni$
Figure 4B:
FIG. 4(B) is a surface microphotograph of $ZrCr_{0.8}Fe_{0.2}Ni$ alloys after hydrogenation.

In order to investigate the changes in particle sizes of Zr-based alloys according to the replacement of alloying elements, scanning electron microphotographs of Zr—Cr—Ni based alloys were observed. FIG. 4 shows scanning electron microphotographs of $ZrCr_{0.8}Mn_{0.2}Ni$ and $ZrCr_{0.8}Fe_{0.2}Ni$ alloys after hydrogenation. From FIG. 4, it can be seen that the alloy in which Cr was replaced partially by Mn has a smaller particle size than the alloy in which Cr was partially replaced By Fe, which indicates that after hydrogenation, the surface area per unit weight of the alloy involved was increased.

Figure 5A:
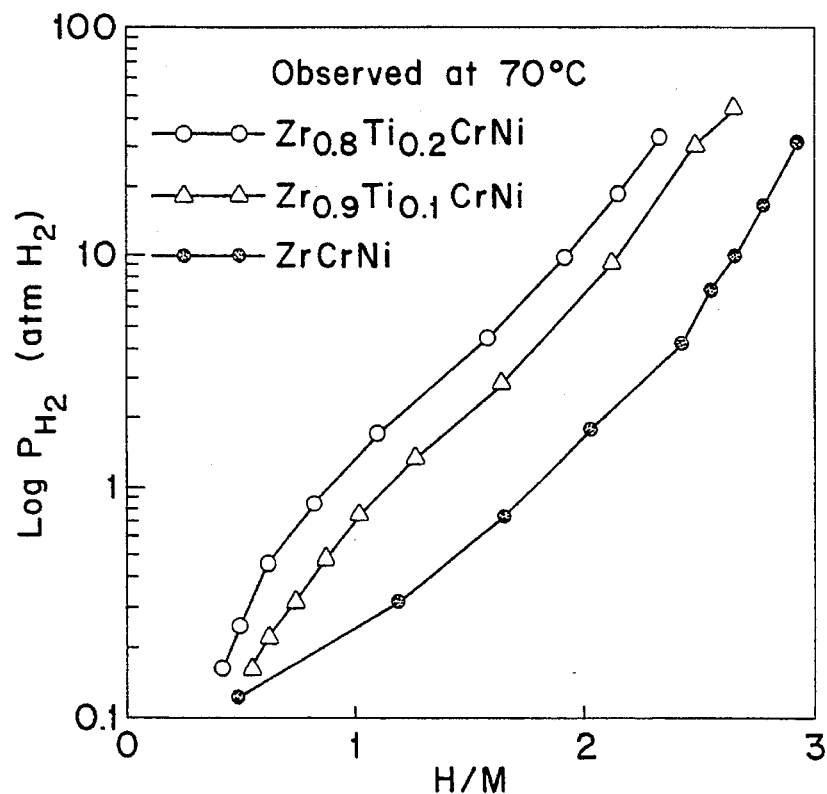
FIG. 5(A) illustrates P-C-T curves of Zr-based alloys having the formula $Zr_{1-x}Q_xCrNi$ wherein Q is Ti, and $x=0.1$ or 0.2.
Figure 5B:
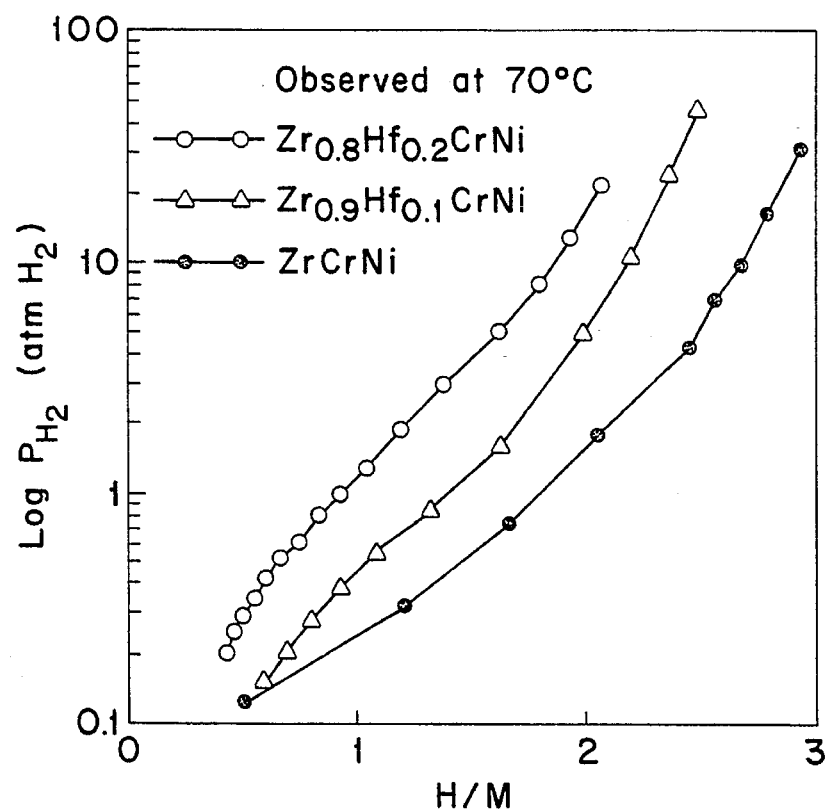
FIG. 5(B) illustrates P-C-T curves of Zr-based alloys having the formula $Zr_{1-x}Q_xCrNi$ wherein Q is Hf, and $x=0.1$ or 0.2, as opposed to ZrCrNi alloy.

FIG. 5 shows P-C-T curves of Zr—Cr—Ni based alloys in which Zr was replaced partially with Ti or Hf. It can be seen from FIGS. 5(A) and 5(B) that the replacement of Zr with Ti or Hf greatly increases the equilibrium hydrogen pressure, although the amount of hydrogen absorbed decreases somewhat.

Figure 6A:
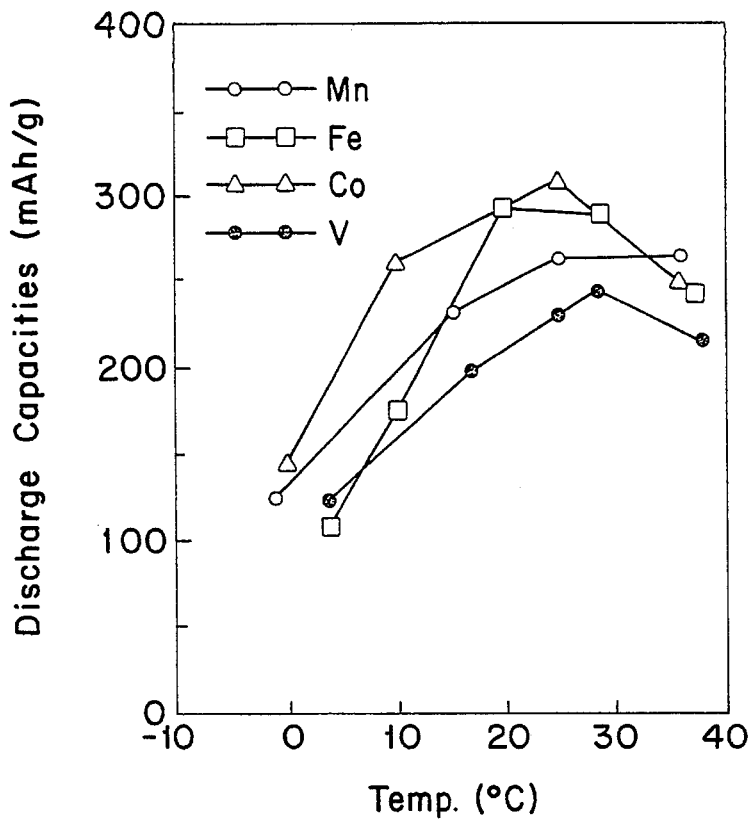
FIG. 6(A) is a graph showing the change of discharge capacities of Zr-based alloys having the formula $ZrCr_{0.8}R_{0.2}Ni$ wherein R is Mn, Fe, Co, or V, depending on the change of temperatures
Figure 6B:
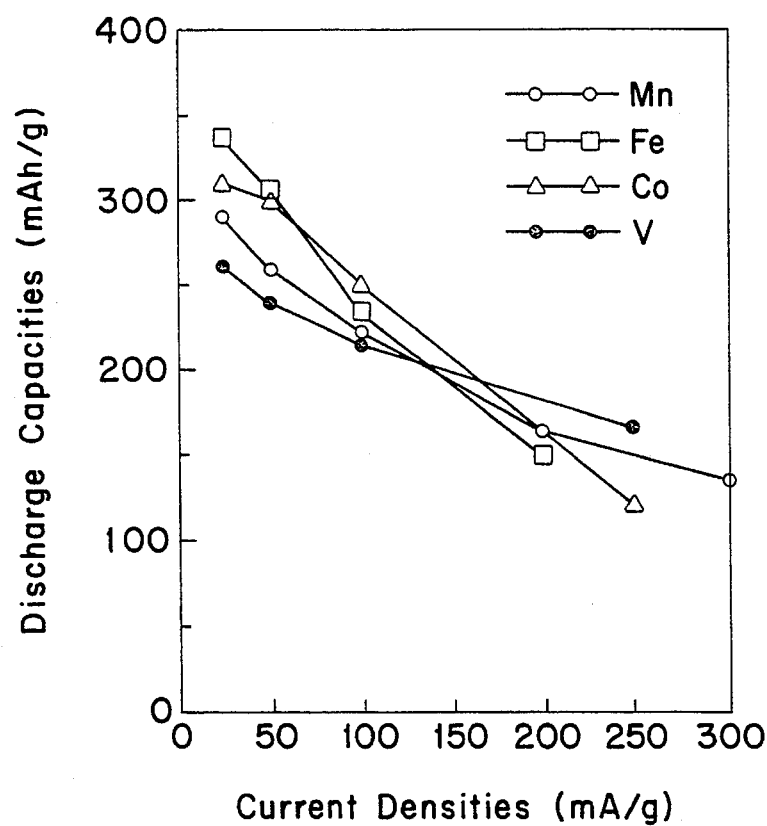
FIG. 6(B) shows a graph showing the change of discharge capacities of Zr-based alloys having the formula $ZrCr_{0.8}R_{0.2}Ni$ wherein R is Mn, Fe, Co, or V, depending on the change of current densities.

FIG. 6 illustrates the graphs showing temperature and current density dependencies of the Zr—Cr—Ni based alloys having the formula $ZrCr_{0.8}R_{0.2}Ni$ wherein R is Mn, Fe, Co, or V. It can be seen from FIG. 6 that the partial replacement of Cr by Mn or V provides the smallest decrease rate of discharge capacity according to the change in temperatures and current densities. This is believed to be resulted from the increase of the surface area capable of reacting with the electrolyte involved. When R is Mn, as observed from the surface photographs after hydrogenation which are shown in FIG. 4, the incorporation of Mn increases the surface area per unit weight capable of reacting with the electrolyte involved resulting in the reduction of the decrease of the discharge efficiency. When R is V, the V present at the surface is melted in the electrolyte and converted into $VO_x$ to increase the surface area on which an electrochemical reaction can take place. This is consistent with the observation of behavior of V in Ti—V—Zr—Ni based alloys, as reported in Int. Symp. on Metal-Hydrogen Systems, Uppsals, Sweden, (1992).

Crystallographic, thermodynamic, and electrochemical properties of the Zr—Cr—N based alloy electrodes are shown in Table 1 below.

TABLE 1

Crystallographic, thermodynamic, and electrochemical properties of Zr—Cr—Ni based alloy electrodes

| Alloy | Crystal structure | Battery capacity | Pd*[1] | H/M*[2] | ΔHd*[3] | Discharge capacity*[4] | $C^{0°C}/C^{25°C}$*[5] | $C^{1C}/C^{0.1C}$*[6] | $C^{100}/C^{0}$*[7] |
|---|---|---|---|---|---|---|---|---|---|
| ZrCrNi | C14*[8] | 179.9 | $<10^{-2}$ | 2.9 | 48.8 | 270 | 0.2 | 0.3 | 0.98 |
| $ZrCr_{1.05}Ni$ | C14*[8] | 179.1 | 0.02 | 2.88 | 46.86 | 280 | 0.28 | 0.32 | 0.98 |
| $ZrCr_{1.1}Ni$ | C14*[8] | 179 | 0.025 | 2.82 | 39.6 | 326 | 0.28 | 0.33 | 0.99 |
| $ZrCr_{1.2}Ni$ | C14*[8] | 176.4 | 0.031 | 2.75 | 36.7 | 295 | 0.33 | 0.33 | 0.99 |
| $ZrCr_{0.8}Mn_{0.2}Ni$ | C14*[8] | 180.1 | 0.02 | 2.7 | 43.8 | 295 | 0.4 | 0.52 | 0.95 |
| $ZrCr_{0.8}Fe_{0.2}Ni$ | C14*[8] | 176.31 | 0.6 | 2.66 | 22.89 | 335 | 0.38 | 0.33 | 0.97 |
| $ZrCr_{0.8}Co_{0.2}Ni$ | C14*[8] | 176.93 | 0.55 | 2.6 | 25.215 | 310 | 0.5 | 0.36 | 0.99 |

TABLE 1-continued

Crystallographic, thermodynamic, and electrochemical properties of Zr—Cr—Ni based alloy electrodes

| Alloy | Crystal structure | Battery capacity | Pd*1 | H/M*2 | ΔHd*3 | Discharge capacity*4 | $C^{0° C.}/C^{25° C.}$*5 | $C^{1C}/C^{0.1C}$*6 | $C^{100}/C^{0}$*7 |
|---|---|---|---|---|---|---|---|---|---|
| $ZrCr_{0.8}V_{0.2}Ni$ | C14*8 | 180.42 | <10⁻² | 2.8 | 50.1 | 260 | 0.6 | 0.65 | 0.97 |
| $ZrCr_{0.5}Mn_{0.5}Ni$ | C14*8 | 179.02 | 0.1 | 2.8 | 40.5 | 250 | 0.51 | 0.64 | 0.92 |
| $ZrCr_{0.5}Fe_{0.5}Ni$ | C15*9 | 350.16 | 2.02 | 2.2 | 20.8 | 200 | 0.34 | 0.38 | 0.95 |
| $ZrCr_{0.5}Co_{0.5}Ni$ | C15*9 | 346.81 | 2 | 2.18 | 18.85 | 180 | 0.3 | 0.35 | 0.98 |
| $Zr_{0.9}Ti_{0.1}CrNi$ | C14 | 192.67 | 0.43 | 2.3 | 46.4 | 280 | 0.27 | 0.37 | 0.989 |
| $Zr_{0.8}Ti_{0.2}CrNi$ | C14 | 193.9 | 0.89 | 2.02 | 22.7 | 250 | 0.31 | 0.36 | 0.985 |
| $Zr_{0.9}Hf_{0.1}CrNi$ | C14 | 193.59 | 0.28 | 2.45 | 29.95 | 275 | 0.35 | 0.36 | 0.985 |
| $Zr_{0.8}Hf_{0.2}CrNi$ | C14 | 191.94 | 0.76 | 2.15 | 27.76 | 246 | 0.38 | 0.34 | 0.98 |

*1 Discharging equilibrium pressure at 25° C., H/M = 1.5
*2 Amounts of hydrogen absorbed at $P_{H2}$ = 1 atm, 25° C.
*3 Hydriding dissociation enthalpy (KJ/mole H)
*4 Discharge capacity at 25° C., 50 mA/g (mAh/g)
*5 Discharge capacity ratio at 0° C. and 25° C.
*6 Discharge capacity ratio at 25 mA/g (= 0.1) and 250 mA/g (= 1C)
*7 Discharge capacity ratio at the beginning and after discharge of 100 cycles
*8 HCP
*9 FCC

EXAMPLE 2

High-performance Zr-based hydrogen storage alloys for secondary battery electrodes Zr-based hydrogen storage alloys for secondary battery electrodes were prepared by partially replacing Zr with Ti, or Cr with Fe, Co, Mn, or V. Crystallographic, thermodynamic, and electrochemical properties of the resultant alloys are shown in Table 2 below.

electrodes which are presently in practical use, with comparable temperature and current density dependency.

Figure 7A:
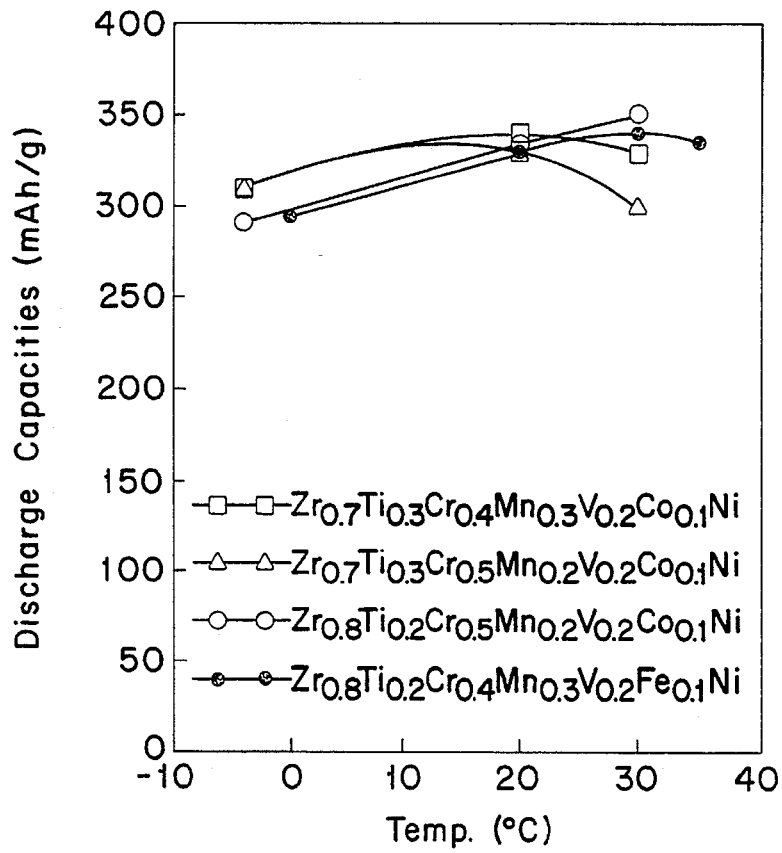
FIG. 7(A) is a graph showing the change of discharge capacities of Zr—Ti—Cr—Mn—V—Co—Ni based alloys according to the invention, depending on the change of temperatures
Figure 7B:
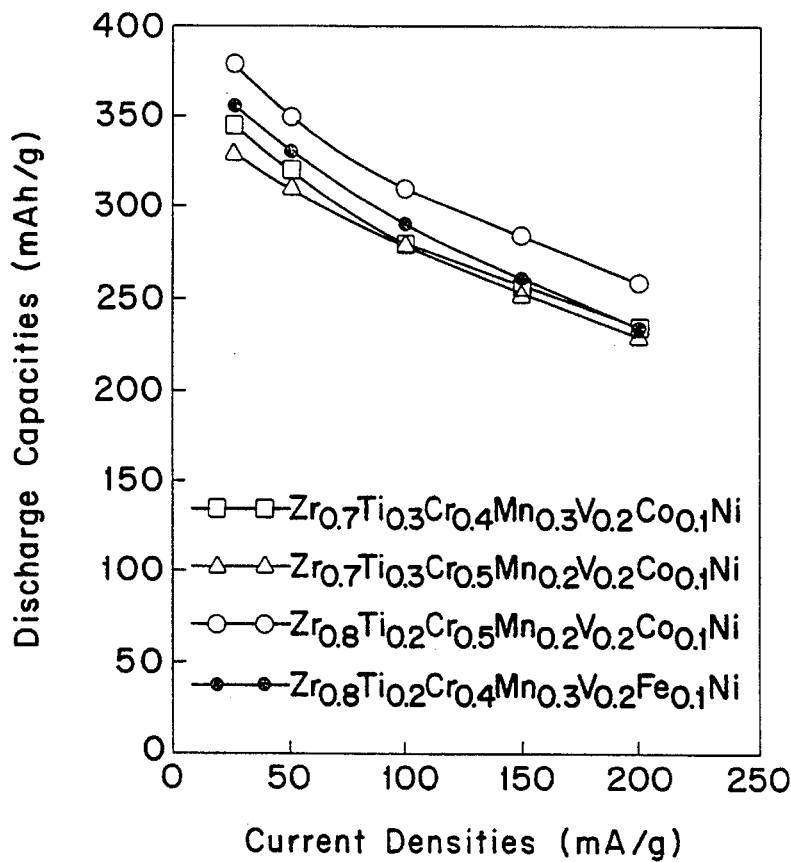
FIG. 7(B) shows a graph showing the change of discharge capacities of Zr—Ti—Cr—Mn—V—Co—Ni based alloys according to the invention, depending on the change of current densities.

FIG. 8 shows the changes in discharge capacity of each electrode prepared from the Zr—Cr—Ni based alloys of FIG. 7, depending on cycles. These alloy electrodes exhibit a very small reduction in discharge capacity as the number of cycles increases, even after 100 discharge cycles. Thus, it is concluded that Zr—Ti—(CrMnFe(or Co)V)—Ni based alloy electrodes are superior to Ni—MH hydrogen storage

TABLE 2

Crystallographic, thermodynamic, electrochemical properties of Zr-based electrode

| Alloy | Battery capacity | Pd*1 | H/M*2 | ΔHd*3 | Discharge capacity*4 | $C^{0° C.}/C^{25° C.}$*5 | $C^{1C}/C^{0.1C}$*6 | $C^{100}/C^{0}$*7 |
|---|---|---|---|---|---|---|---|---|
| $ZrCr_{0.8}Mn_{0.3}Ni$ | 177 | 0.3 | 2.6 | 31.8 | 280 | 0.7 | 0.72 | 0.94 |
| $ZrCr_{0.6}Mn_{0.5}Ni$ | 176.85 | 0.8 | 2.6 | 36.82 | 265 | 0.8 | 0.75 | 0.91 |
| $Zr_{0.9}Ti_{0.1}Cr_{0.6}Mn_{0.5}Ni$ | 175.59 | 1.1 | 2.1 | 32.6 | 250 | 0.78 | 0.74 | 0.93 |
| $ZrCr_{0.5}Mn_{0.5}V_{0.1}Ni$ | 178.21 | 0.4 | 2.3 | 32.8 | 240 | 0.85 | 0.78 | 0.97 |
| $ZrCr_{0.3}Mn_{0.8}Ni$ | 176.74 | 0.35 | 2.9 | 33.68 | 285 | 0.83 | 0.76 | 0.85 |
| $Zr_{0.9}Ti_{0.1}Cr_{0.3}Mn_{0.8}Ni$ | 177.17 | 0.15 | 2.85 | 31.54 | 280 | 0.85 | 0.75 | 0.86 |
| $ZrCr_{0.3}Nn_{0.7}V_{0.1}Ni$ | 177.99 | 0.21 | 2.8 | 29.69 | 310 | 0.9 | 0.8 | 0.94 |
| $Zr_{0.8}Ti_{0.2}Cr_{0.3}Mn_{0.8}V_{0.1}Ni$ | 175.98 | 3.1 | 1.3 | 32.22 | — | — | — | — |
| $Zr_{0.8}Ti_{0.2}Cr_{0.5}Mn_{0.2}V_{0.2}Co_{0.1}Ni$ | 176.43 | 0.05 | 2.8 | 35.5 | 355 | 0.92 | 0.66 | 0.97 |
| $Zr_{0.8}Ti_{0.2}Cr_{0.4}Mn_{0.3}V_{0.2}Fe_{0.1}Ni$ | 175.69 | 0.06 | 2.86 | 34.8 | 333 | 0.87 | 0.081 | 0.96 |
| $Zr_{0.7}Ti_{0.3}Cr_{0.4}Mn_{0.3}V_{0.2}Co_{0.1}Ni$ | 175.21 | 0.08 | 2.75 | 30.87 | 325 | 0.94 | 0.70 | 0.98 |
| $Zr_{0.7}Ti_{0.3}Cr_{0.5}Mn_{0.2}V_{0.2}Co_{0.1}Ni$ | 175.13 | 0.75 | 2.73 | 31.56 | 310 | 0.95 | 0.74 | 0.97 |

*1 Discharging equilibrium pressure at 25° C., H/M = 1.5
*2 Amounts of hydrogen absorbed at $P_{H2}$ = 1 atm, 25° C.
*3 Hydriding dissociation enthalpy (KJ/mole H)
*4 Discharge capacity at 20° C., 50 mA/g (mAh/g)
*5 Discharge capacity ratio at 0° C. and 25° C.
*6 Discharge capacity ratio at 25 mA/g (= 0.1) and 250 mA/g (= 1C)
*7 Discharge capacity ratio at the beginning and after discharge of 100 cycles As can be seen from Tables 1 and 2, Zr-based hydrogen storage alloy electrodes of the present invention have a discharge capacity of 300~377 mAh/g, which is similar to or higher than that of conventional Zr-based alloy electrodes.

FIG. 7 shows temperature and current density dependencies of discharge capacities of the alloy electrodes according to the invention. These alloy electrodes have an about 1.5 times greater discharge capacity than MnNi-based Ni—MH alloy electrodes which are in use and Zr-based alloy electrodes having a C-15 cubic structure in many aspects.

What is claimed is:

1. A single-phase, zirconium-based hydrogen storage alloy useable for second battery applications, having the composition formula consisting of:

$$Zr_{1-x}Q_xCr_{1-Y-Z-A-B}Mn_YFe_ZCo_AV_BNi \quad (I)$$

wherein Q is Ti or Hf; $0.1 < x \leq 0.3$; $0 < Y < 1$; $0 \leq Z$; $A < 1$; $0 < B < 1$; $0 < Y+Z+A+B < 1$; and $Y+Z+A > 0.2$; provided that Z and A are not 0 at the same time.

2. The zirconium-based hydrogen storage alloy according to claim 1, wherein $Z=0$.

3. The zirconium-based hydrogen storage alloy according to claim 1, wherein $A=0$.

4. The zirconium-based hydrogen storage alloy according to claim 1 or 2, which is selected from the group consisting of:

$Zr_{0.8}Ti_{0.2}Cr_{0.5}Mn_{0.2}V_{0.2}Co_{0.1}Ni$, $Zr_{0.7}Ti_{0.3}Cr_{0.4}Mn_{0.3}V_{0.2}Co_{0.1}Ni$, and $Zr_{0.7}Ti_{0.3}Cr_{0.5}Mn_{0.2}V_{0.2}Co_{0.1}Ni$.

5. The zirconium-based hydrogen storage alloy according to claim 1, having a composition formula consisting of $Zr_{0.8}Ti_{0.2}Cr_{0.4}Mn_{0.3}V_{0.2}Fe_{0.1}Ni$.

* * * * *